(12) United States Patent
Katona

(10) Patent No.: US 8,651,149 B2
(45) Date of Patent: Feb. 18, 2014

(54) FLUID FILLED JACKET FOR CONCRETE PIPE

(75) Inventor: Michael Katona, Gig Harbor, WA (US)

(73) Assignee: Michael G. Katona, Gig Harbor, WA (US)

( * ) Notice: Subject to any disclaimer, the term of this patent is extended or adjusted under 35 U.S.C. 154(b) by 239 days.

(21) Appl. No.: 13/230,176

(22) Filed: Sep. 12, 2011

(65) Prior Publication Data

US 2013/0061972 A1    Mar. 14, 2013

(51) Int. Cl.
*F16L 9/00*    (2006.01)

(52) U.S. Cl.
USPC ............. 138/172; 138/99; 138/153; 138/106; 405/157

(58) Field of Classification Search
USPC .................. 138/172, 99, 153, 106, 114, 115; 405/157
See application file for complete search history.

(56) References Cited

U.S. PATENT DOCUMENTS

| | | | | |
|---|---|---|---|---|
| 2,674,857 A * | 4/1954 | Fortes | ............................ | 405/132 |
| 3,056,183 A * | 10/1962 | Pigeot | ............................ | 264/228 |
| 3,279,500 A * | 10/1966 | Feder | ............................ | 138/110 |
| 3,379,221 A * | 4/1968 | Harry et al. | .................... | 138/148 |
| 3,480,043 A * | 11/1969 | Viancour et al. | ................ | 138/99 |
| 3,650,299 A * | 3/1972 | Seiler et al. | .................... | 138/149 |
| 3,699,690 A * | 10/1972 | Watter | ........................ | 405/157 |
| 3,734,138 A * | 5/1973 | Brown et al. | ................. | 138/106 |
| 3,773,090 A * | 11/1973 | Ghersa et al. | ................. | 138/141 |
| 4,357,961 A * | 11/1982 | Chick | ............................. | 138/97 |
| 4,590,971 A * | 5/1986 | Webster et al. | ............... | 138/149 |
| 4,657,050 A * | 4/1987 | Patterson | ...................... | 138/149 |
| 4,840,200 A * | 6/1989 | Creedon | ....................... | 138/172 |
| 5,020,481 A * | 6/1991 | Nelson | ......................... | 122/494 |
| 6,076,562 A * | 6/2000 | Kuo | ................................ | 138/175 |
| 6,116,290 A * | 9/2000 | Ohrn et al. | ................... | 138/149 |
| 6,349,976 B1 * | 2/2002 | Taylor, Jr. | .................... | 285/123.1 |
| 6,739,926 B2 * | 5/2004 | Riach et al. | .................... | 441/133 |
| 6,752,176 B1 * | 6/2004 | Price et al. | .................... | 138/109 |
| 7,029,205 B2 * | 4/2006 | Daigle | .......................... | 405/157 |
| 2004/0086339 A1 * | 5/2004 | Tyrer et al. | .................... | 405/156 |

FOREIGN PATENT DOCUMENTS

EP    300169 A1 *    1/1989

* cited by examiner

*Primary Examiner* — Kevin P Shaver
*Assistant Examiner* — Nicholas J Weiss

(57) ABSTRACT

A fluid jacket concrete pipe system includes a concrete pipe enveloped by a fluid-filled jacket. The fluid-filled jacket includes an inner jacket wall, an outer jacket wall, and a first and second side wall interconnecting the inner jacket wall to the outer jacket wall. A fluid inlet is disposed on the outer jacket wall. The outer jacket wall has a thickness dependent on a diameter of the concrete pipe and an external loading of the fluid jacket concrete pipe system.

4 Claims, 3 Drawing Sheets

FLUID FILLED JACKET FOR CONCRETE PIPE

BACKGROUND OF THE INVENTION

The present invention generally relates to systems and apparatus of underground pipe, and, more particularly, to a fluid-filled jacket for concrete pipe.

Steel reinforced concrete (R/C) pipes are routinely used in underground applications such as culverts, storm-water drains, and sanitary sewers. Concrete is well suited to carry compressive stresses, but not tensile stresses because tensile strength of concrete is an order of magnitude smaller than the compressive strength of concrete. Consequently, some buried concrete pipes may exhibit significant tensile cracking due to circumferential bending moments that are caused by non-uniform soil pressures acting on the pipe periphery. Some concrete pipe manufacturers compensate for concrete's tensile weakness by placing circumferential rows of reinforcing steel in the concrete wall to sustain the tensile load when the concrete cracks. The cracked portion of the concrete wall is structurally useless except as a matrix to contain the steel reinforcement. Hence, as currently designed, traditional concrete pipes have two economic shortcomings: the need of substantial reinforcing steel and the need of thicker concrete walls to account for concrete cracking.

As can be seen, there is a need for an improved system and apparatus of underground pipe that does not transmit bending moments to the concrete pipe.

SUMMARY OF THE INVENTION

In one aspect of the present invention, a fluid jacket pipe system comprises a pipe; and a fluid-filled jacket disposed on an outside of the pipe and configured to conform to an outside surface of the pipe, wherein the fluid-filled jacket comprises an inner jacket wall; an outer jacket wall; a first and a second side wall interconnecting the outer jacket wall to the inner jacket wall; and a fluid inlet disposed on the outer jacket wall, wherein the outer jacket wall has a thickness dependent on the diameter of the pipe and an external loading of the fluid jacket pipe system.

In another aspect of the present invention, a fluid-filled jacket comprises an inner jacket wall; an outer jacket wall; a first side wall interconnecting the outer jacket wall to the inner jacket wall; a second side wall interconnecting the outer jacket wall to the inner jacket wall, wherein the second side wall is the mirror image of the first side wall; and a fluid inlet disposed on the outer jacket wall, wherein the inner jacket wall, the outer jacket wall, the first side wall, and the second side wall define an inside space, wherein the inside space is configured as a cylinder, wherein the cylinder has a diameter, and wherein a thickness of the outer jacket wall is dependent on the diameter of the cylinder, and an external loading on the fluid jacket concrete pipe system.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a fluid jacket concrete pipe system that includes a concrete pipe enveloped by a fluid jacket unit. The fluid jacket unit allows the fluid jacket concrete pipe system to be buried more than twice as deep as conventional steel-reinforced concrete pipes, with less than half the amount of concrete and no steel reinforcement. The fluid jacket unit allows transmission of only hydrostatic compressive stresses to the concrete pipe thereby eliminating bending moments and tensile stresses in the concrete pipe.

Figure 1:
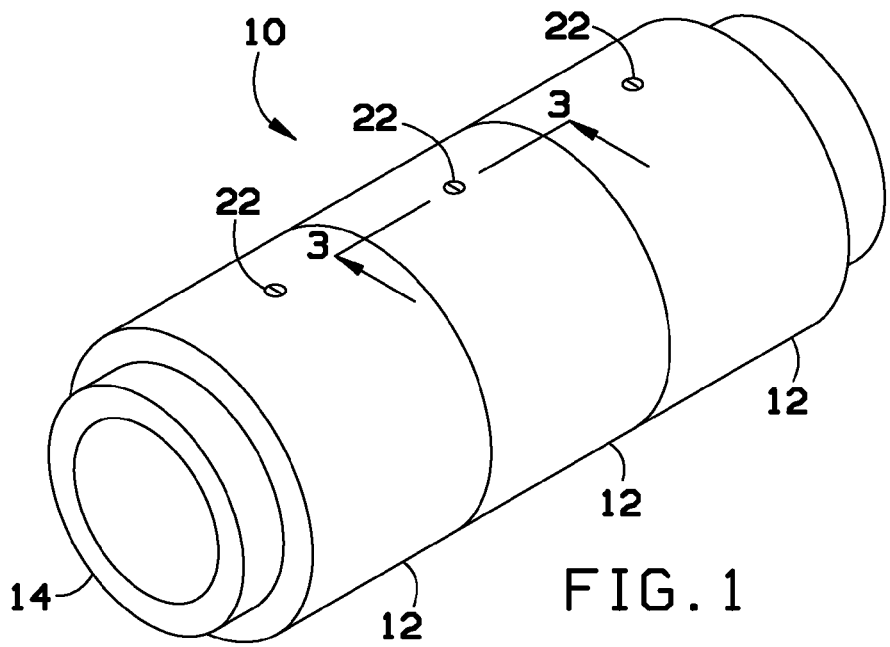
FIG. 1 is an oblique perspective view of a fluid jacket pipe system according to an exemplary embodiment of the present invention.
Figure 2:
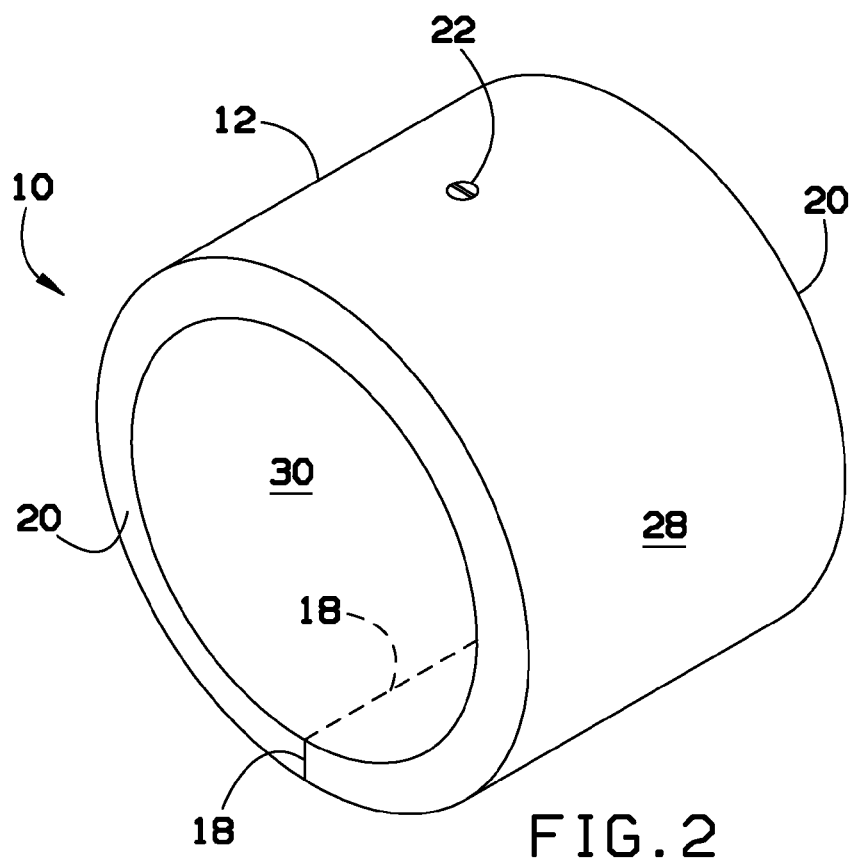
FIG. 2 is an oblique perspective view of the fluid jacket unit of FIG. 1.
Figure 3:
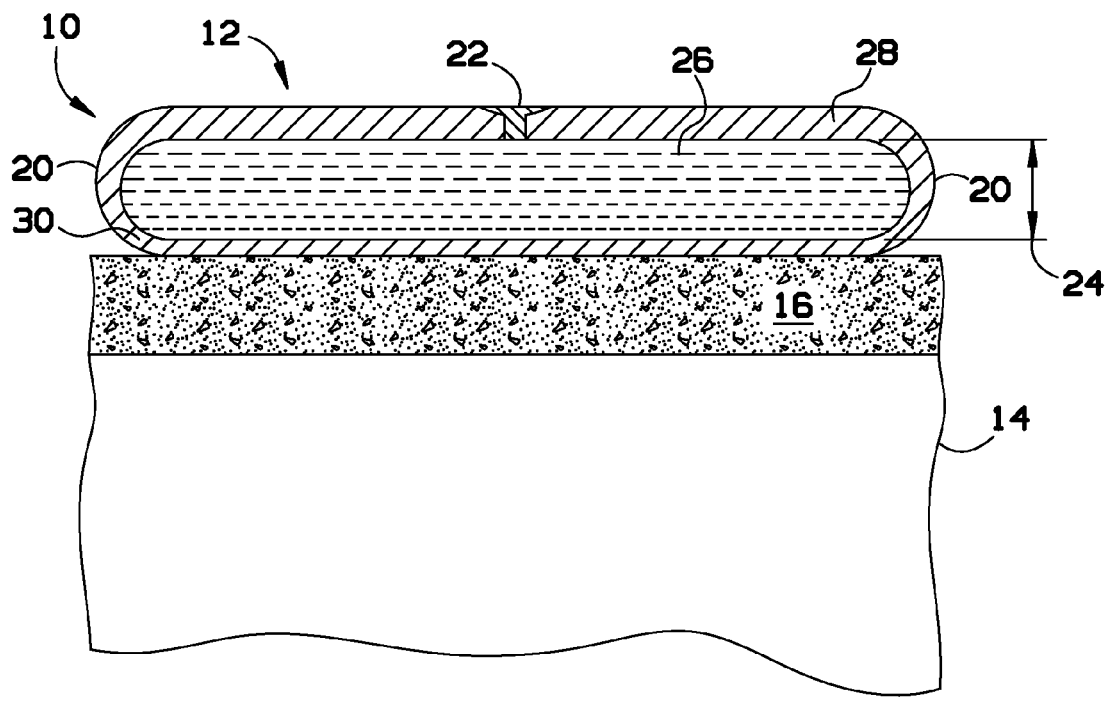
FIG. 3 is a cross sectional view of an exemplary embodiment of the system of FIG. 1 taken along line 3-3.

Referring to FIGS. 1 & 2, a fluid jacket pipe system 10 is provided that includes a fluid jacket unit 12 assembled to, or enveloping, an outside of a concrete pipe 14. Fluid jacket unit 12 may be cylindrically shaped and may be concentric about concrete pipe 14, and may include side walls 20 on ends thereof that may interconnect an outer jacket wall 28 to an inner jacket wall 30 therebetween. Side walls 20, outer jacket wall 28, and inner jacket wall 30 may define an inner space that may be capable of containing a fluid 26. A fluid inlet 22 may be located on outer jacket wall 28 at a top (crown) thereof and configured to receive or regulate fluid 26 or a pressure of the inner space and fluid 26 contained therein. Fluid inlet 22 may include a receptacle, valve, or tube that may be permanently sealed (e.g., by a plug, weld, or closure) after fluid jacket unit 12 is filled with fluid 26. Fluid 26 may be a liquid (e.g., water or water solution), and may include additives or solutes such as antifreeze, for example. Referring now to FIG. 3, a fluid gap 24 may be a distance between outer jacket wall 28 (or outer jacket profile wall 32 in FIG. 4) and inner jacket wall 30 (or inner jacket smooth wall 34 in FIG. 4), and may determine a maximum deflection of outer jacket wall 28 before outer jacket wall 28 contacts inner jacket wall 30. Outer jacket and inner jacket walls 28, 30 may be flexible membranes configured to deform or deflect in response to external loads, transmit loads to fluid 26, or conform to an outer surface of concrete pipe 14.

A stabilizing fin 18 may be a thick webbing that may split or bisect the inner space defined by fluid jacket unit 12, and may interconnect outer jacket wall 28 with inner jacket wall 30 along a length of fluid jacket unit 12 (indicated by a dotted line in FIG. 2), and may maintain a normal separation distance therebetween. Stabilizing fin 18 may maintain a normal distance between outer and inner jacket walls 28, 30 and restrain concrete pipe 14 from floating upwards within fluid jacket unit 12 due to buoyant forces when the fluid-jacket unit is filled with fluid.

Figure 4:
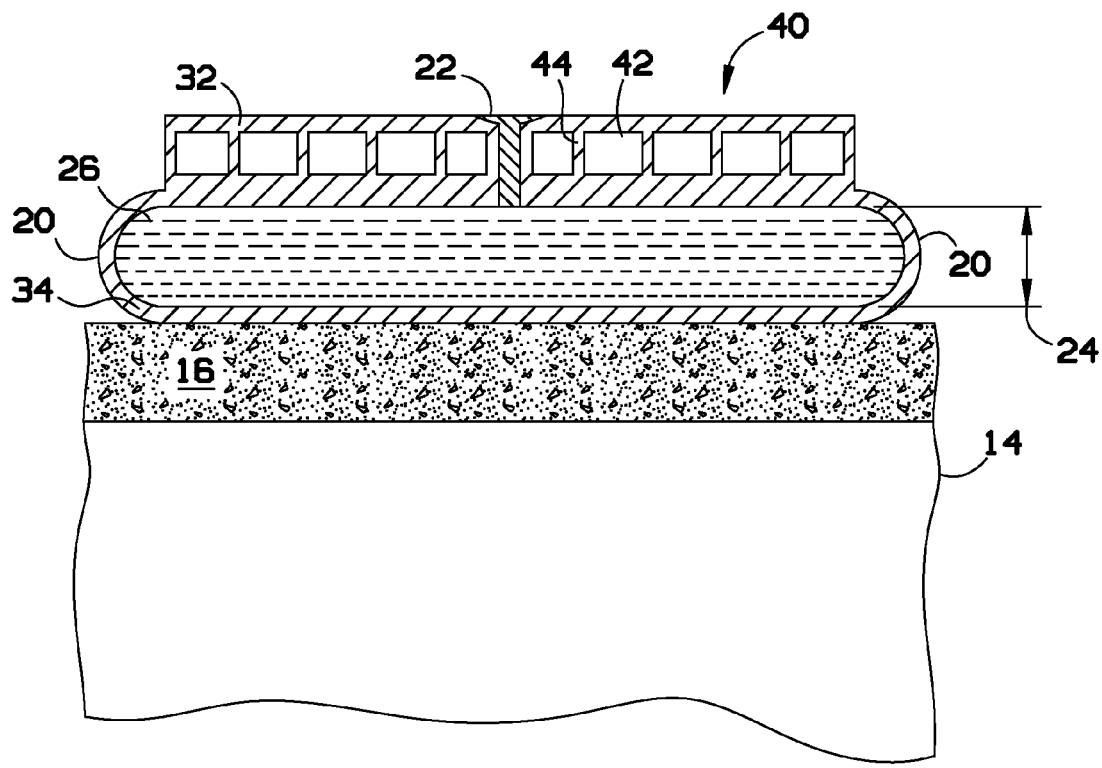
FIG. 4 is a cross sectional view of a fluid jacket pipe system according to another exemplary embodiment.

Referring now to FIG. 4, a fluid jacket unit 40 is shown according to another exemplary embodiment. Fluid jacket unit 40 may have an inner jacket smooth wall 34, which may be interconnected to outer jacket profile wall 32 by sidewalls 20. Outer jacket profile wall 32 may have a plurality of circumferential ribs 44 therein, which may define a plurality of circumferential cells 42. The defined plurality of cells 42 may be empty or solid elements. Circumferential ribs 44 and cells 42 may provide enhanced stiffness over outer jacket wall 28

Figure 5:
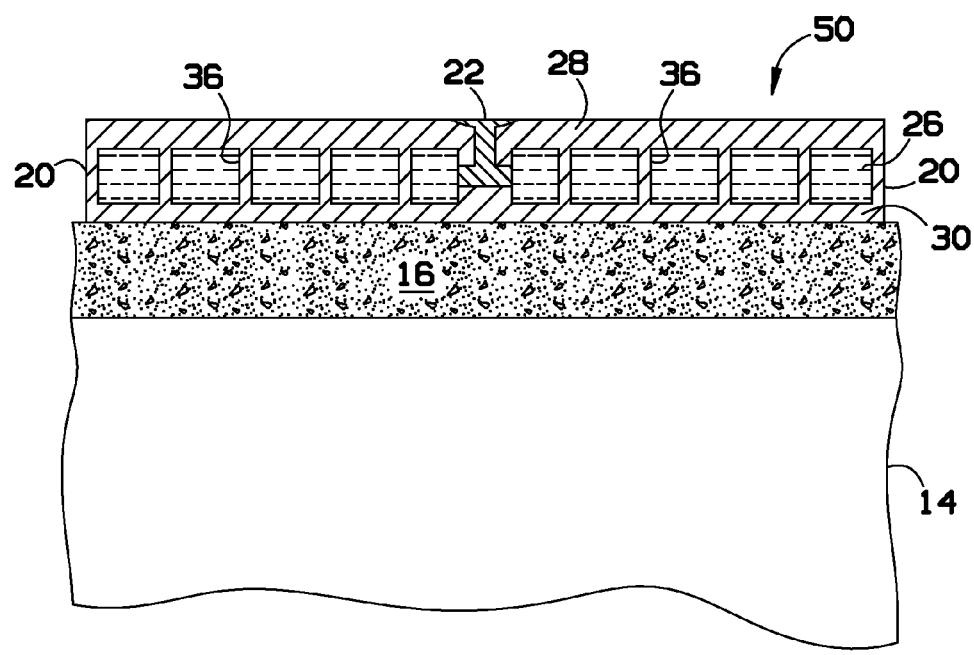
FIG. 5 is a cross sectional view of a fluid jacket pipe system according to yet another exemplary embodiment.

Referring now to FIG. 5, fluid jacket unit 50 is shown according to yet another exemplary embodiment Fluid jacket unit 50 may include circumferential thin web elements 36 that may run along a circumference thereof between inner jacket wall 30 and outer jacket wall 28. Circumferential web elements 36 may be between inner jacket wall 30 and outer jacket wall 28, and within fluid gap 24. A plurality of apertures (not pictured) may be formed in circumferential web elements 36 that allow fluid communication therethrough.

Figure 6:
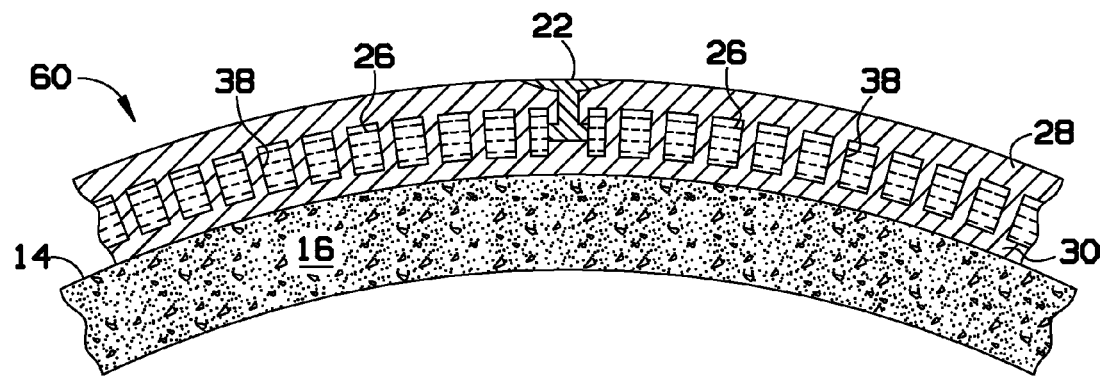
FIG. 6 is a partial cross-sectional end view of a fluid jacket pipe system according to still another exemplary embodiment.

Referring now to FIG. 6, fluid jacket unit 60 is shown according to still another exemplary embodiment. Fluid jacket unit 60 may include longitudinal web elements 38 that may run along a length thereof between inner jacket wall 30 and outer jacket wall 28, and may be a thin webbing within fluid gap 24. A plurality of apertures (not pictured) may be formed in longitudinal web elements 38 that allow fluid communication therethrough.

According to one exemplary embodiment, a circumference of inner jacket wall 30 corresponds to an outer circumference of concrete pipe 14, and a circumference of outer jacket wall 28 is about 15% greater than a circumference of inner jacket wall 30. Inner jacket wall 30 may be about 0.2 inches thick, and outer jacket wall 28 may be about 10% of a thickness of a wall of concrete pipe 14 and may depend upon a loading specification of fluid jacket pipe system 10. A thickness of side walls 20 may uniformly increase from where it is molded or joined with inner jacket wall 30 to where it is molded or joined with outer jacket wall 28. Concrete pipe 14 may have an inside diameter ranging from about 12 inches to more than 12 feet. Fluid jacket unit 12 may be about two feet in length. Fluid jacket units 12, 40, 50, 60 may be an environmentally stable polymer (e.g., high density polyethylene, polyvinyl chloride, or propylene) or a flexible material, laminate, or woven material (e.g., fiber glass, carbon fiber, Kevlar). Fluid gap 24 may be about equal to the thickness of a wall of concrete pipe 14.

According to other exemplary embodiments, sidewalls 20 may include a fastener (not pictured) on an outside surface thereof, which may be configured to engage or interconnect to a corresponding fastener of a sidewall 20 of a second fluid jacket unit 12, which may enable two or more fluid jacket units 12 to interconnect to create a series of fluid jacket units 12.

It should be understood, of course, that the foregoing relates to exemplary embodiments of the invention and that modifications may be made without departing from the spirit and scope of the invention as set forth in the following claims.

What is claimed is:

1. A fluid jacket pipe system comprising:
a pipe; and
    a first fluid-filled jacket disposed on an outside of the pipe and configured to conform to an outside surface of the pipe,
    wherein the first fluid-filled jacket comprises:
      an inner jacket wall;
      an outer jacket wall;
      a first and a second side wall interconnecting the outer jacket wall to the inner jacket wall; and
      a fluid inlet disposed on the outer jacket wall,
      wherein the outer jacket wall has a thickness dependent on a thickness of the pipe and an external loading of the fluid jacket pipe system,
    wherein the outer jacket wall further comprises a profile wall, wherein the profile wall includes a plurality of circumferential ribs that define a plurality of cells.

2. The fluid jacket pipe system of claim 1,
wherein the inner jacket wall, the outer jacket wall, and the first and second side walls define an inside space, and
wherein the first fluid-filled jacket further comprises a fluid disposed in the inside space.

3. The fluid jacket pipe system of claim 2,
wherein the first fluid-filled jacket further comprises a stabilizing fin, wherein the stabilizing fin is disposed in the inside space,
wherein the stabilizing fin interconnects the inner jacket wall to the outer jacket wall,
wherein the stabilizing fin interconnects the first side wall to the second side wall along a length of the first fluid-filled jacket.

4. The fluid jacket pipe system of claim 1,
wherein the first side wall is configured to interact by contact with a second side wall of a second fluid-filled jacket assembled adjacent to the first fluid-filled jacket, and
wherein the first fluid filled jacket is cylindrically shaped.

* * * * *